UNITED STATES PATENT OFFICE.

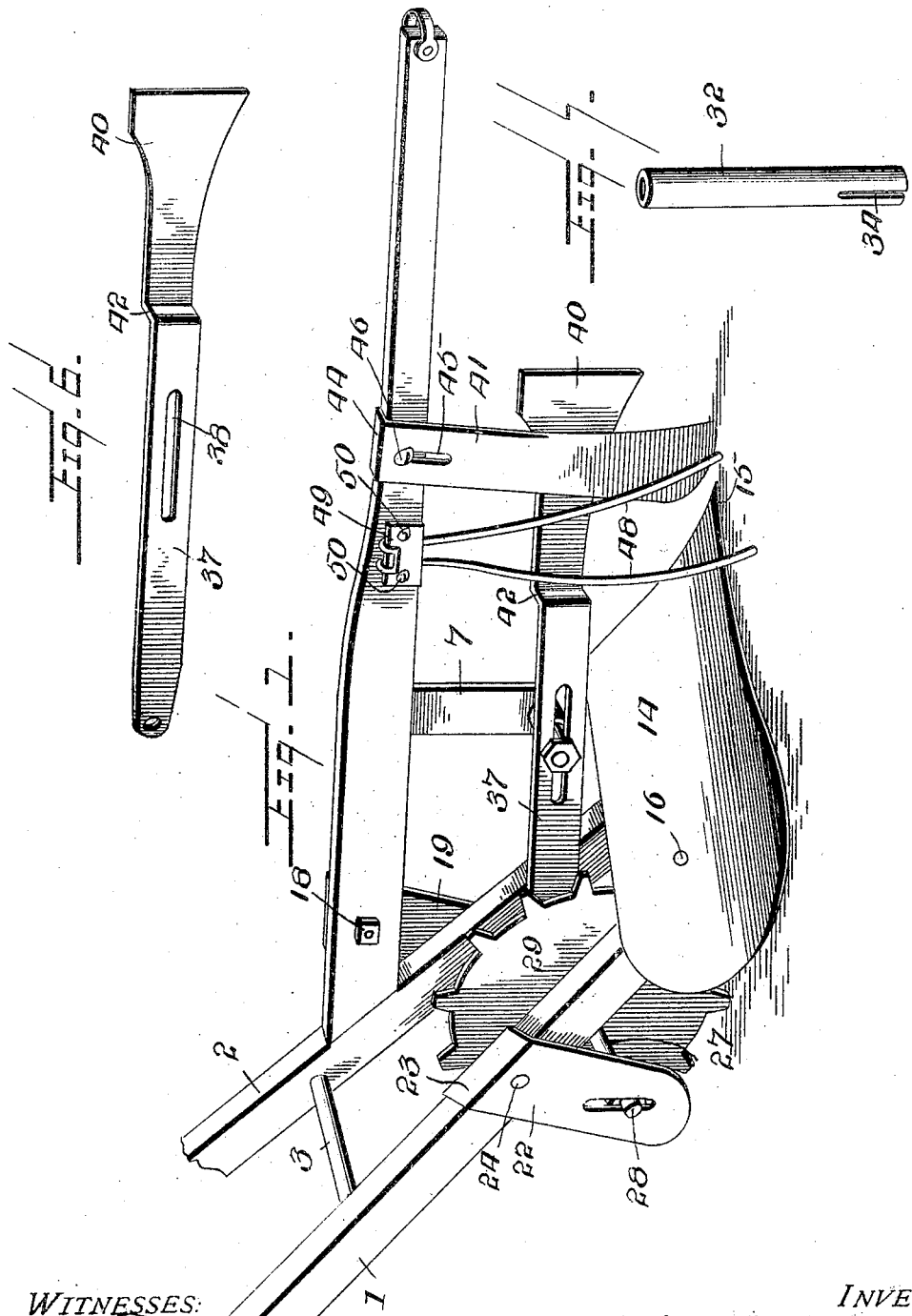

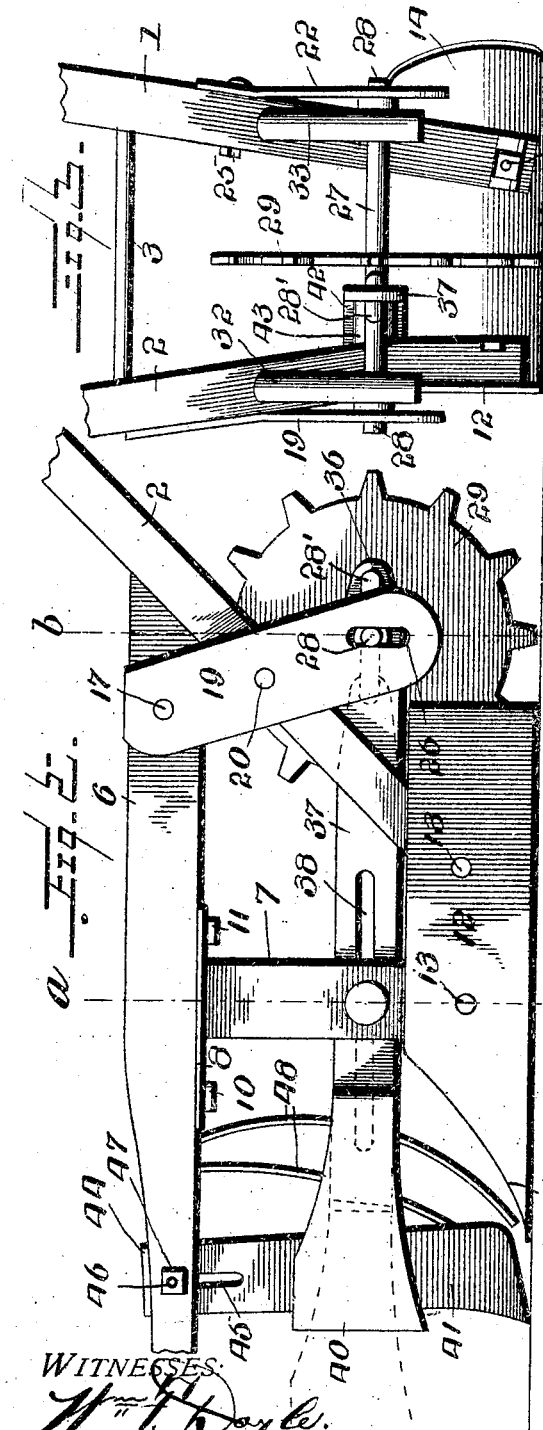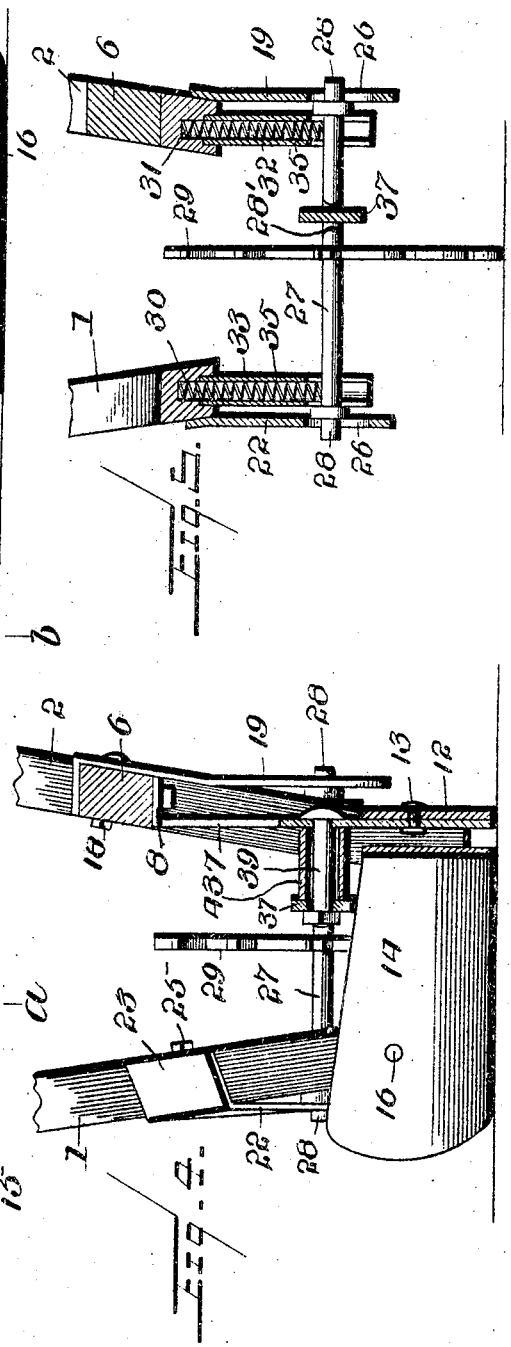

MICHEL Z. THOMAS, OF PUEBLO, COLORADO, ASSIGNOR OF ONE-HALF TO ZANDER TAUB AND ALBERT TAUB, OF PUEBLO, COLORADO.

PLOW.

No. 797,926. Specification of Letters Patent. Patented Aug. 22, 1905.

Application filed November 11, 1903. Serial No. 180,745.

*To all whom it may concern:*

Be it known that I, MICHEL Z. THOMAS, a citizen of the United States, residing at Pueblo, in the county of Pueblo and State of Colorado, have invented certain new and useful Improvements in Plows, of which the following is a specification.

This invention relates to plows, and has for one of its objects to provide a simple, durable, compact, and economically-constructed device of the character named.

Another object of the invention resides in the employment of an attachment arranged with relation to the plow for automatically clearing the structure of weeds, grass, and other accumulations.

A still further object of the invention resides in means for permitting a cushioning action between the wheel of the plow and the plow-frame.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a perspective view of the plow embodying my invention. Fig. 2 is a side elevation of the side opposite to that shown in Fig. 1, illustrating in dotted lines the movement of the clearing-blade with relation to the colter. Fig. 3 is a rear elevation. Fig. 4 is a sectional view on the line *a a* of Fig. 2. Fig. 5 is a sectional view on the line *b b* of Fig. 2. Fig. 6 is a detail perspective view of the colter-clearer, and Fig. 7 is a detail perspective view of one of the casings for inclosing a coil-spring.

Referring now more particularly to the accompanying drawings, the reference characters 1 and 2 designate the usual form of plow-handles, having one or more of the usual cross or brace pieces 3. Intermediate the handle member 2 and secured in any suitable manner thereto is arranged the plow-beam 6, the numeral 7 indicating the standard, which in this instance has its upper end 8 bent at a right angle to its body portion and fitted between the under side of the beam and a plate 9, bolts and nuts 10 and 11, respectively, passing through the beam and the plate to securely retain the standard in position. Of course I do not limit myself to the securing of the upper end of the standard to the beam in the manner shown and described, it being obvious that other means may be employed, if desired.

Secured to the lower end of the standard 7 and the handle 2 is arranged the ordinary form of landside element 12, the same being secured upon the standard and handle by any suitable means—for instance, the bolts 13, as shown.

A moldboard 14 bridges the tapered end 15 of the landside and the lower end of the handle 1, a bolt 16 piercing the moldboard and said handle to secure the former at one side, while its opposite side is secured in any suitable manner. As a matter of fact, the landside and moldboard may be formed of a single piece of material.

Disposed at the rear of the beam 6 and secured to the outer face thereof by means of a bolt and nut 17 and 18, respectively, or other suitable means is an axle-hanger 19, which inclines slightly toward the rear of the plow and whose intermediate portion is pierced by the bolt or other element 20, which passes through the handle 2 of the plow, a nut or other means being screwed or otherwise secured upon the free end of the element 20 for a purpose well understood. Thus it will be seen that the hanger 19, having the aforesaid connections with the beam and handle 2, serves to brace them and prevent undue strain upon one with relation to the other.

Another axle-hanger 22, whose upper end is preferably bent at a right angle, as at 23, designed to fit upon the upper surface of the handle 1, is disposed directly opposite and lies in the same plane with the aforesaid hanger, the hanger 22 being firmly secured upon its corresponding hanger by means of the bolt and nut 24 and 25, respectively, or in any other suitable manner. Each of these hangers is provided with a slotted journal-bearing 26 at its lower free end, which lie in substantially a vertical plane with relation to each other and the resting position of the plow.

An axle 27 has its ends 28 rounded, squared, or otherwise formed and journaled in the journal-bearings 26 of the axle-hangers 19 and 22, the axle having a bent crank portion 28′ for a purpose presently understood, there being a toothed or other wheel 29, fixedly secured upon the axle adjacent the bent portion 28'.

Formed in the under side of each of the plow-handles 1 and 2 is a recess or depression 30 and 31, respectively, both of which receive the upper open ends of tubings or casings 32 and 33 of any suitable material, whose lower ends are bifurcated, as indicated by the reference character 34, and by reason of which the lower ends thereof may embrace opposite ends of the axle 27, there being a coil-spring or other flexible means 35 arranged within each tubing or casing. It is apparent that by reason of the bifurcated ends of the casings or tubings and the slotted journal-bearings in which the axle is mounted a vertical play of the latter is permitted and that in view of the springs carried within the casings, with their lower ends exerting pressure upon the axle, jarring of the plow, and consequently the arms of the plowman, is prevented when the wheel 29 encounters stones or other obstructions in its path.

Loosely or otherwise fitted at one of its ends upon the part 36 of the bent crank portion of the axle 27 is an arm 37, provided intermediate its length with a slot 38, arranged longitudinally therewith and working upon a suitable support or projection 39, secured to the standard 7, with its free end preferably enlarged, as indicated by the reference character 40, the enlarged portion of the arm having its edges preferably sharpened to rid the colter 41 of roots, weeds, or stubble which may accumulate thereon in plowing the ground. It will be seen that the knife portion—that is, the enlarged portion 40—is offset to one side or laterally of the arm by reason of the angular bend 42 and that a spacing-collar or sleeve 43 is loosely fitted upon the projection or support 39 and disposed between the standard 7 and the inner face of the arm 37 at its juncture with the longitudinal slot of the latter, the said collar taking up the space caused by the angular bend 42 and insuring a square meeting engagement of the inner side of the knife portion or clearer with the colter, thereby efficiently carrying out the purpose for which it is designed. As shown in the drawings, this collar or sleeve 43 is of greater internal diameter than the support or projection 39 for the purpose of reducing friction and permitting a free and easy movement of the arm. In other words, if the collar or sleeve were fitted tightly upon the projection or support 39 the movement of the arm would not be as free as desired, and, furthermore, as shown in the drawings, there is absolutely no danger of corrosion or clogging of dirt or other foreign matter between the collar or sleeve and arm to the extent that perfect operation would be hindered.

The colter 41 has its upper end 44 bent at an angle thereto, the bent portion lying upon the top surface of the plow-beam. This bent portion of the colter is not altogether essential and may be omitted, if desired. The colter, however, is preferably secured to the beam in such manner as to render it adjustable—for instance, by providing the same with an elongated slot 45 or the equivalent—permitting of a vertical adjustment through the assistance of a bolt or other element 46 piercing the beam and secured at its free end by means of a nut or the like 47.

Secured at their upper ends, preferably between the colter and standard, are arranged tines 48, the same being for a well-known purpose and in this instance being secured to the beam by means of a plate 49 and suitable fastenings 50.

From the foregoing description it will be seen that a highly efficient and rigid plow is produced and that as the axle turns in its bearings the bent crank portion thereof causes the arm and its blade to operate in a manner customary in the movement of a pitman, and thus automatically and satisfactorily clearing the colter of foreign matter, causing the foreign matter to be deposited in the bottom of the furrow, the dotted lines in Fig. 2 of the drawings illustrating what is practically a circular movement of the knife-blade over one side of the colter. It will be seen also that my colter-clearing attachment may be readily applied to any of the plows now in use.

I claim—

1. A plow, including handles, a beam, a standard and a colter, said standard having an offset projection; an axle carried by the plow; a wheel mounted upon the axle; and an arm secured to the axle and provided with a slot intermediate its ends, whereby the arm may be slidably supported upon the projection of the standard, said arm having an offset blade portion for engagement with the colter.

2. A plow, including handles, a beam, a standard and a colter, said standard having an offset projection; an axle carried by the plow; a wheel mounted upon the axle; an arm secured to the axle and provided with a slot intermediate its ends, whereby the arm may be slidably supported upon the projection of the standard, said arm having an offset blade portion for engagement with the colter; and a spacing element arranged upon the projection of the standard between the latter and the inner face of said arm.

3. A plow comprising handles having a recess in their under surfaces; a beam secured to one of the handles; axle-hangers arranged in the rear of the moldboard of the plow, said hangers having a slot in their lower ends; an axle mounted in the slots of the hangers, said axle having a crank-bend therein, a wheel mounted upon the axle adjacent said bend; casings having bifurcated ends embracing the axle and their opposite ends fitted in the recesses of the handles; a coil-spring arranged within said casings; a standard having a projection thereon; a colter; an arm mounted upon the axle adjacent its crank-bend and having an offset blade portion for engagement with the colter, the said arm being slidably mounted upon the said projection of the standard; and a spacing element arranged upon said projection between the standard and arm.

4. A plow including a beam and handles each having a recess in its under surface; an axle carried by the plow; a wheel mounted upon the axle; casings having bifurcated ends embracing the axle and their opposite ends fitted in the recesses of the handles; and a coil-spring arranged within each casing to exert pressure upon the axle working in the bifurcated ends of said casings.

5. In a plow, the combination with a colter and a standard, the latter having an offset projection; a clearing element associated with the plow for clearing the colter, the clearing element being slidably mounted upon the projection of the standard and including an integral offset blade portion, and a spacing element carried by the projection of the standard and arranged between the latter and the clearing element.

6. A plow, including handles, a beam, a standard and a colter; said standard having an offset projection; and an arm provided with a slot for coöperation with the projection of the standard, said arm having an integral offset blade portion.

In testimony whereof I affix my signature in presence of two witnesses.

MICHEL Z. THOMAS.

Witnesses:
BENJ. F. KOPERLIK,
ELIAS MARGOLIS.